April 14, 1970   D. K. BANERJEE   3,506,131
STRAINERS OR FILTERS FOR TUBE WELLS
Filed May 13, 1968   2 Sheets-Sheet 2
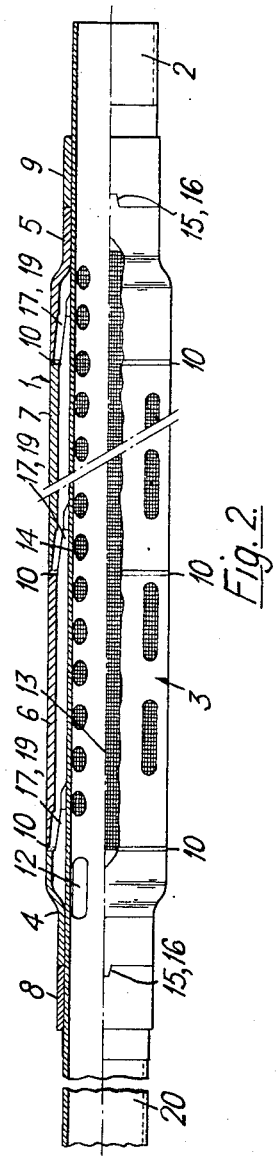
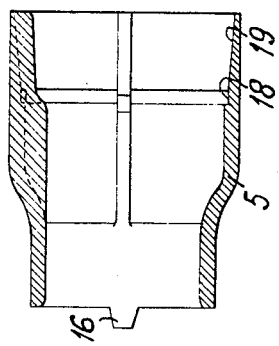
Inventor
Dilip K. Banerjee
By
Stevens, Davis, Miller & Mosher
Attorneys

United States Patent Office 3,506,131
Patented Apr. 14, 1970

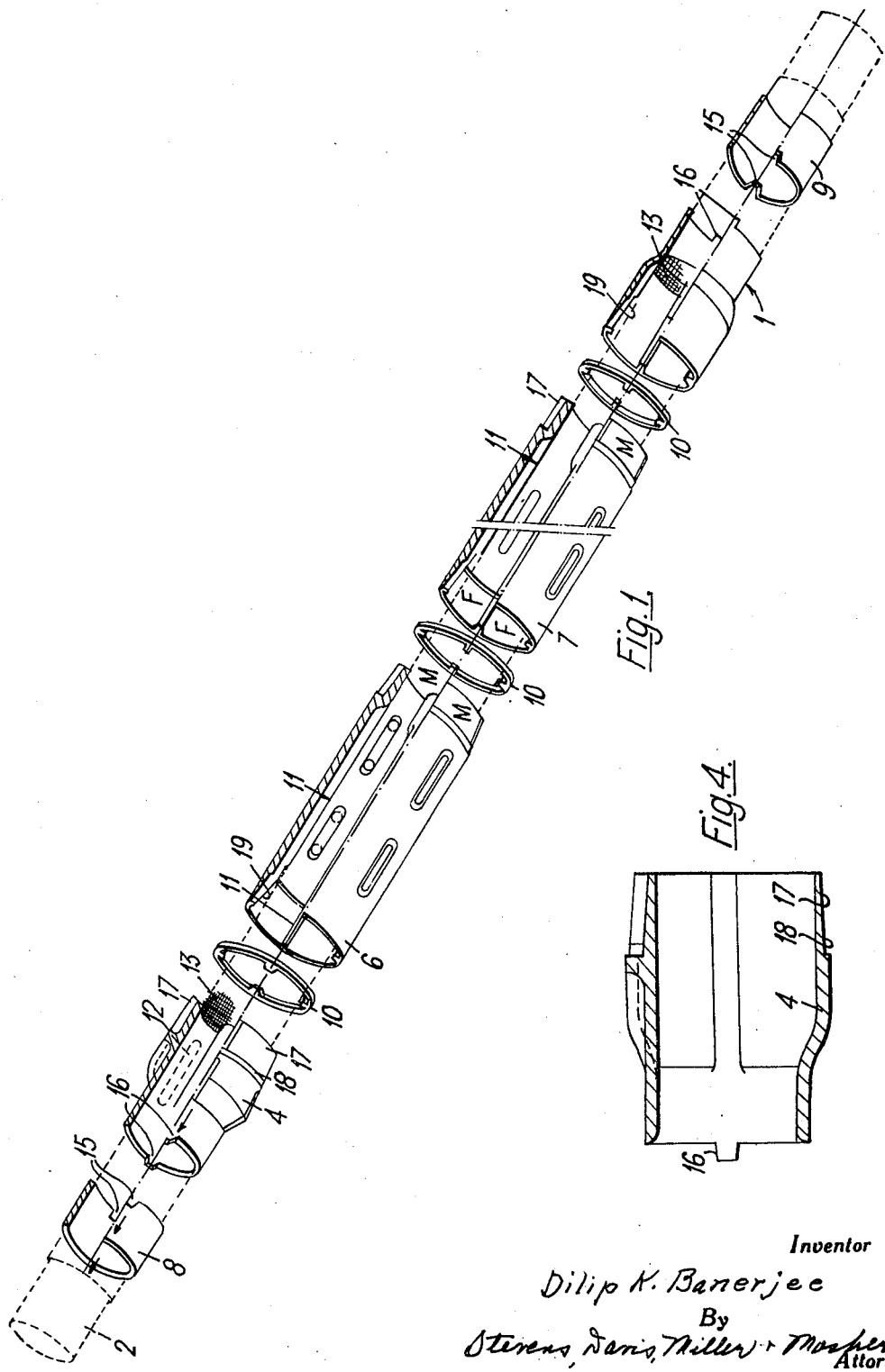

---

3,506,131
STRAINERS OR FILTERS FOR TUBE WELLS
Dilip Kumar Banerjee, Plot–N, Jodhpur Park,
Calcutta 31, West Bengal, India
Filed May 13, 1968, Ser. No. 728,470
Int. Cl. B01d 29/16
U.S. Cl. 210—441          2 Claims

ABSTRACT OF THE DISCLOSURE

A tube well strainer adapted to prevent the clogging of the screening thereof with particulate material from its surroundings wherein the screened portion of the filter is covered with a longitudinally extending perforate outer shell.

---

This invention relates to strainers or filters for tube wells, both for domestic and irrigation or industrial purposes.

In the conventional types of strainers the soil plays directly on the screening material and tends to clog the same by incrustation and gripping so that very shortly, or fairly quickly, the filters or strainers fail to perform their duty.

The root causes of the strainer failure are choking of the screen material by finer particles of sand, excessive scale formation on screen and main metal pipe due to hard mineral water and corrosive action on the screen and main metal pipe by oxidative, chemical or electrolytic process.

When finer sand particles stop the screen opening or cause incrustation due to excessive scale formation on the screen or on the main metal tube due to continuous contact with hard mineral water, choking of the screen material is inevitable.

If the sand particles are not permitted to come into contact with the screen material, choking due to deposit of such particles can be eliminated. This, is proposed to be done, in accordance with this invention, by providing an outer shell around the screen or the main tube if the latter itself is formed as a screen.

In order to prevent incrustation or scale formation due to hard mineral water, such screen material or main tube is selected which inhibits the formation of scale or crust. Thus the screen may be made out of woven mono filaments made of such synthetic material polyethylene, polypropylene, nylon and the like.

The outer shell may be made of plastic or metal, either ferrous or non-ferrous. When plastics are used the shell is usually formed by injection or compression moulding. It may also be extruded and/or fabricated. If metal is used the shell is cast and then machined, or die cast, forged and machined.

In order to prevent corrosion resulting from oxidative chemical or electrolytic processes, material for construction of the strainer is selected out of those which resist corrosion due to the aforesaid causes.

According to this invention the outer envelope or shell or jacket comprises of a plurality of sections of smaller lengths held onto the main tube. To ensure that the outer shell will not be subject to any undesirable movement end retaining members are provided to hold the end sections onto the main metal tube.

When the filter or strainer is made from entirely non-metallic materials it cannot corrode or get pitted for the non-metals are resistant to electrolytic corrosions and being virtually chemically inert they are resistant to soil corrosion as well. When the main tube is made of plastic its inner wall is smooth and therefore there is virtually no resistance to the flow of water in it. Such a construction, as a result, offers most effective use of the maximum pump capacity with minimum power utilisation for a longer period of time. As there is no scale formation both suction and discharge capacity remain unaltered for a longer period.

The provision of the outer shell not only prevents direct contact between the strainer materials and the fine particles of sand but at the same time the gap between it and the main tube acts as a constant source of water which minimises the pump start-up load. The effective strainer area remains free from soil or sand grip.

If the outer shell is made in one single cylindrical piece it is extremely difficult and expensive to machine the innumerable fine slots and/or holes on its periphery. Again, if such jacket or outer shell were to be made from a sheet material which is first slotted, the slotting or fine-hole formation in such sheet is also not a simple or economic process. The sheet after hole formation has to be curled into a cylindrical shape, brazed at its two longitudinal edges to form an envelope and after the envelope is slipped on to the main tube it has to be brazed at its ends for fitting on to the main tube and then finished. This process is extremely expensive. However, the filter or strainer proposed herein is comprised of a plurality of segments of smaller length which are slipped on over the main tube and joined together to form necessary length of the shell.

According to this invention thus there is provided a tube well strainer or filter comprising a main, inner, screened tube for filtering purposes, and a spacedly disposed outer shell comprising of a plurality of open ended, cylindrical or like, sections, each such section being removably joined to, or fitted into, adjacent sections on either side, the end sections being additionally adapted to be fitted to the outer wall of the said main screened tube by known means.

The main tube of the strainer or filter may have a number of openings such as slots or holes, not for straining or filtering purposes but as inlets, covered by a gauze or screen. This may also be similarly enveloped by the above described outer shell.

For the shell sections to spacedly abut against the main tube or the gauze on such tube, a plurality of longitudinally extending ribs are provided on the inner walls of the sections. It is preferable that such shell closely fit spacedly around the main tube.

The end sections are preferably held to the main tube by means of end retaining members so as to prevent any undesirable movement of the outer shell.

The assembly or fixing of the various sections together around the main tube can be done in several ways. For example it may be effected by snapping-on, slipping-in, screwing, twisting or push-pull or the like known arrangements.

In one arrangement of assembling the various sections of the outer shell around the main tube, one end of each section is made as female, or receiving, end and the other end male, or the inserting, end. Preferably the end retaining members are formed with a female or the receiving end with which the male end of the end section is engageable. Preferably also the end of the bottom end section away from the end retaining member is formed with male or inserting, end and of top end section as a female, or receiving, end.

The soil cannot go through the screening material and during use of the pump some of it is in agitation due to movement of the water and collects outside the tube. When pumping stops, by virtue of the non-cohesive surface of the screen material, such collected soil falls away from the screen by force of gravity and is drained away through a set of sedimentation ports formed in the end portion of the main tube where it is surrounded by the bottom end section of the outer shell. A false tube is attached to the lower end of the main tube to carry away the drained sediment from the zone where the water is pumped up. Since the sediment falls in a closed system no turbulence is caused in such zone by subsequent pumping nor during subsequent pumping can such sediment contaminate the water which is being pumped up.

When the outer shell material and the screening material i.e. the metal of the main tube are different or have different coefficients of expansion a differential expansion of the two, i.e. the outer shell and the main tube, will occur. In order to provide for any such differential expansion rings are provided at the joints of the sections. Such expansion rings are necessarily of a material which is softer than the material of the outer shell of the main tube.

The invention is described below with reference to the accompanying drawings wherein:

FIG. 1 is part sectional exploded perspective of a filter or strainer according to this invention;

FIG. 2 is part sectional assembly of same;

FIG. 3 is sectional view of top end section; and

FIG. 4 is sectional view of bottom end section.

Referring to the drawings the tube well filter or strainer 1 comprises a screened main tube 2 having an outer shell 3 made into a number of segments or sections 4, 5, 6 and 7 (there may be more than two intermediate sections 6 and 7). 8 and 9 are end retaining members for end sections 4 and 5 respectively. Expansion rings between and at joints of the sections 4, 6, 7 and 5 are marked 10. Longitudinally extending ribs inside the various segments of the outer shell are marked 11.

Sedimentation port, under bottom end section 4 in the pipe 2, is marked 12. The screening material on the outer shell is marked 13. Port holes (screened) on the inner, main, tube wall are marked 14.

After inserting one end retaining member, say 8, and thereafter the corresponding end section 4, various sections 6, 7 and 5 followed by end retaining member 9, are inserted to envelope the required length of the main tube 2. Usually somewhat more than the screened length of the tube 2 is so enveloped.

End retaining members have female ends 15 into which male ends 16 of end sections are inserted for engagement.

The other end of bottom section 4 is also male ended having tapering male members 17 with a flat portion 18 where expansion ring 10 is seated. Section 6 has corresponding tapering female member 19 to engage the male members 17 of section. Other end of section 6 is male ended as just described and the remaining section 7 (and others, if there are more than two intermediate sections) is similarly male ended on one side and female ended on the other end are engaged by such means to the other sections.

Accordingly the end, away from the end retaining member, of top end section is female ended.

The sedimentation will drop through port 12 into the lower portion of tube 2 away from water pumping zone and fall into a false tube 20, closed at its bottom.

Having fully described my invention, I claim:

1. A tube well strainer comprising a main perforate tube, screen means consisting essentially of synthetic material, surrounding said main tube at least in part; a sectionalized perforate outer shell spacedly disposed about said screen so that an annular space is provided between said screen and said outer shell; end retaining means connecting said outer shell to said main tube in order to prevent any undesirable movement thereof; and expansion rings consisting essentially of material softer than that of said outer shell located at the junctions between the outer shell sections in order to provide for any differential expansion between said outer shell and said main tube.

2. A strainer as claimed in claim 1 characterised therein that the inner walls of the said sections have a plurality of longitudinally extending ribs abutting against the main tube to provide a close fit.

References Cited

UNITED STATES PATENTS

| 565,890 | 8/1896 | Fowler | 210—445 X |
| 1,204,171 | 11/1916 | McKay | 210—445 |
| 3,221,819 | 12/1965 | Dickinson et al. | 210—460 X |
| 3,357,564 | 12/1967 | Medford | 210—457 X |

REUBEN FRIEDMAN, Primary Examiner

T. A. GRANGER, Assistant Examiner